(12) United States Patent
Sawabe et al.

(10) Patent No.: US 7,994,452 B2
(45) Date of Patent: Aug. 9, 2011

(54) LASER BEAM MACHINING APPARATUS

(75) Inventors: Taiki Sawabe, Ota-ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 793 days.

(21) Appl. No.: 12/006,565

(22) Filed: Jan. 3, 2008

(65) Prior Publication Data

US 2008/0169274 A1 Jul. 17, 2008

(30) Foreign Application Priority Data

Jan. 11, 2007 (JP) ................................. 2007-003780

(51) Int. Cl.
*B23K 26/06* (2006.01)
*B23K 26/38* (2006.01)

(52) U.S. Cl. ............................... 219/121.75; 219/121.83

(58) Field of Classification Search .................. 359/641, 359/823, 822; 219/121.73, 121.75, 121.83, 219/121.67, 121.68
See application file for complete search history.

(56) References Cited

U.S. PATENT DOCUMENTS

| | | | | |
|---|---|---|---|---|
| 4,190,759 A | * | 2/1980 | Hongo et al. | 219/121.68 |
| 5,783,798 A | * | 7/1998 | Abraham | 219/121.73 |
| 2003/0042920 A1 | * | 3/2003 | Kenmoku | 324/752 |

FOREIGN PATENT DOCUMENTS

| | | | | |
|---|---|---|---|---|
| JP | 4-26817 A | * | 1/1992 | |
| JP | 4-46691 A | * | 2/1992 | |
| JP | 7-68396 A | * | 3/1995 | |
| JP | A 10-305420 | | 11/1998 | |
| JP | 2002-316289 A | * | 10/2002 | |
| JP | 2006-49606 A | * | 2/2006 | |

OTHER PUBLICATIONS machine translation of Japan Patent document No. 2002-316,298, Sep. 2010.*
machine translation of Japan Patent document No. 2006-49,606, Sep. 2010.*
Machine translation of Japan Patent No. 2002-316,289, Sep. 2010.*

* cited by examiner

*Primary Examiner* — Geoffrey S Evans
(74) *Attorney, Agent, or Firm* — Greer, Burns & Crain, Ltd.

(57) ABSTRACT

A laser beam machining apparatus including a beam oscillator; a beam adjusting unit disposed between the beam oscillator and a condenser lens and by which the beam diameter and the divergence angle of the beam oscillated from the beam oscillator are adjusted; and a beam diameter and divergence angle detecting unit for detecting the beam diameter and the divergence angle of the beam having passed through the beam adjusting unit. The apparatus further includes a control unit which computes the beam diameter and the divergence angle of the beam, based on detection signals from the beam diameter and divergence angle detecting unit, and which controls the beam adjusting unit, based on the computed beam diameter and divergence angle of the beam and the beam diameter and the divergence angle of the laser beam incident on the beam diameter and divergence angle detecting unit.

1 Claim, 4 Drawing Sheets

LASER BEAM MACHINING APPARATUS

BACKGROUND OF THE INVENTION

1. Field of the Invention

The present invention relates to a laser beam machining apparatus for machining a work by use of a laser beam.

2. Description of the Related Art

In a semiconductor device manufacturing process, a plurality of regions are demarcated in a surface of a substantially circular disk-like semiconductor wafer by planned dividing lines called streets which are arranged in a lattice pattern, and devices such as ICs and LSIs are formed in the demarcated regions. Then, the semiconductor wafer is cut (diced) along the streets to divide the regions with the devices formed therein, whereby individual semiconductor chips are manufactured. As a method for dividing the wafer such as a semiconductor wafer along the streets, there has been proposed a method in which irradiation with a pulsed laser beam is conducted along the streets in the wafer so as to form laser beam-machined grooves, and the wafer is cut (diced) along the laser beam-machined grooves by a mechanical breaking apparatus (refer to, for example, Japanese Patent Laid-open No. Hei 10-305420).

A laser beam machining apparatus for carrying out the above-mentioned laser beam machining includes a chuck table for holding a work, and a laser beam irradiation means for irradiating the work held by the chuck table with a laser beam. The laser beam irradiation means has a laser beam oscillator for oscillating the laser beam, and a condenser lens for condensing the laser beam oscillated from the laser beam oscillator. In such a laser beam irradiation means, the laser beam incident on the condenser lens is desirably a parallel beam having a predetermined beam diameter. Since the laser beam oscillated from the laser beam oscillator has a divergence angle, therefore, a beam adjusting means for making parallel the laser beam oscillated from the laser beam oscillator is arranged between the laser beam oscillator and the condenser lens.

In carrying out the adjustment by use of the beam adjusting means, it is necessary to receive the laser beam incident on the condenser lens by a light receiving means such as CCD, and to manually operate the beam adjusting means while checking the beam diameter and the divergence angle (parallelism). Therefore, the adjusting work takes a long time.

SUMMARY OF THE INVENTION

Accordingly, it is an object of the present invention to provide a laser beam machining apparatus in which the beam diameter and the divergence angle of a laser beam oscillated from a laser beam oscillator and incident on a condenser lens can be automatically adjusted.

In accordance with an aspect of the present invention, there is provided a laser beam machining apparatus including: a chuck table for holding a work; and a laser beam irradiation means for irradiating the work held by the chuck table with a pulsed laser beam, the laser beam irradiation means having a laser beam oscillator and a condenser lens for condensing the laser beam oscillated by the laser beam oscillator; wherein the laser beam machining apparatus includes a beam adjusting means which is disposed between the laser beam oscillator and the condenser lens and by which the beam diameter and the divergence angle of the laser beam oscillated from the laser beam oscillator are adjusted; a beam diameter and divergence angle detecting means for detecting the beam diameter and the divergence angle of the laser beam having passed through the beam adjusting means; and a control means which computes the beam diameter and the divergence angle of the laser beam oscillated from the laser beam oscillator, based on detection signals from the beam diameter and divergence angle detecting means, and which controls the beam adjusting means, based on the computed beam diameter and divergence angle of the laser beam oscillated from the laser beam oscillator and desired values for the beam diameter and the divergence angle of the laser beam incident on the beam diameter and divergence angle detecting means.

A reflecting mirror by which the laser beam having passed through the beam adjusting means is reflected toward the condenser lens is disposed between the beam adjusting means and the condenser lens, and a laser beam transmitted through the reflecting mirror is incident on the beam diameter and divergence angle detecting means.

In addition, the beam adjusting means includes: a first lens and a second lens which are disposed on an optical path of the laser beam oscillated from the laser beam oscillator and are movable along the optical path; a first moving means and a second moving means for respectively moving the first lens and the second lens along the optical path; and a first lens position detecting means and a second lens position detecting means for respectively detecting the moved positions of the first lens and the second lens.

The laser beam machining apparatus based on the present invention includes the beam adjusting means which is disposed between the laser beam oscillator and the condenser lens and by which the beam diameter and the divergence angle of the laser beam oscillated from the laser beam oscillator are adjusted, the beam diameter and divergence angle detecting means for detecting the beam diameter and the divergence angle of the laser beam having passed through the beam adjusting means, and the control means which computes the beam diameter and the divergence angle of the laser beam oscillated from the laser beam oscillator, based on the detection signals from the beam diameter and divergence angle detecting means, and which controls the beam adjusting means, based on the computed beam diameter and divergence angle of the laser beam oscillated from the laser beam oscillator and desired values for the beam diameter and the divergence angle of the laser beam incident on the beam diameter and divergence angle detecting means. Therefore, upon mounting or replacement of the laser beam oscillator, the beam diameter and the divergence angle (parallelism) of the laser beam oscillated from the laser beam oscillator and incident on the condenser lens can be adjusted automatically.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
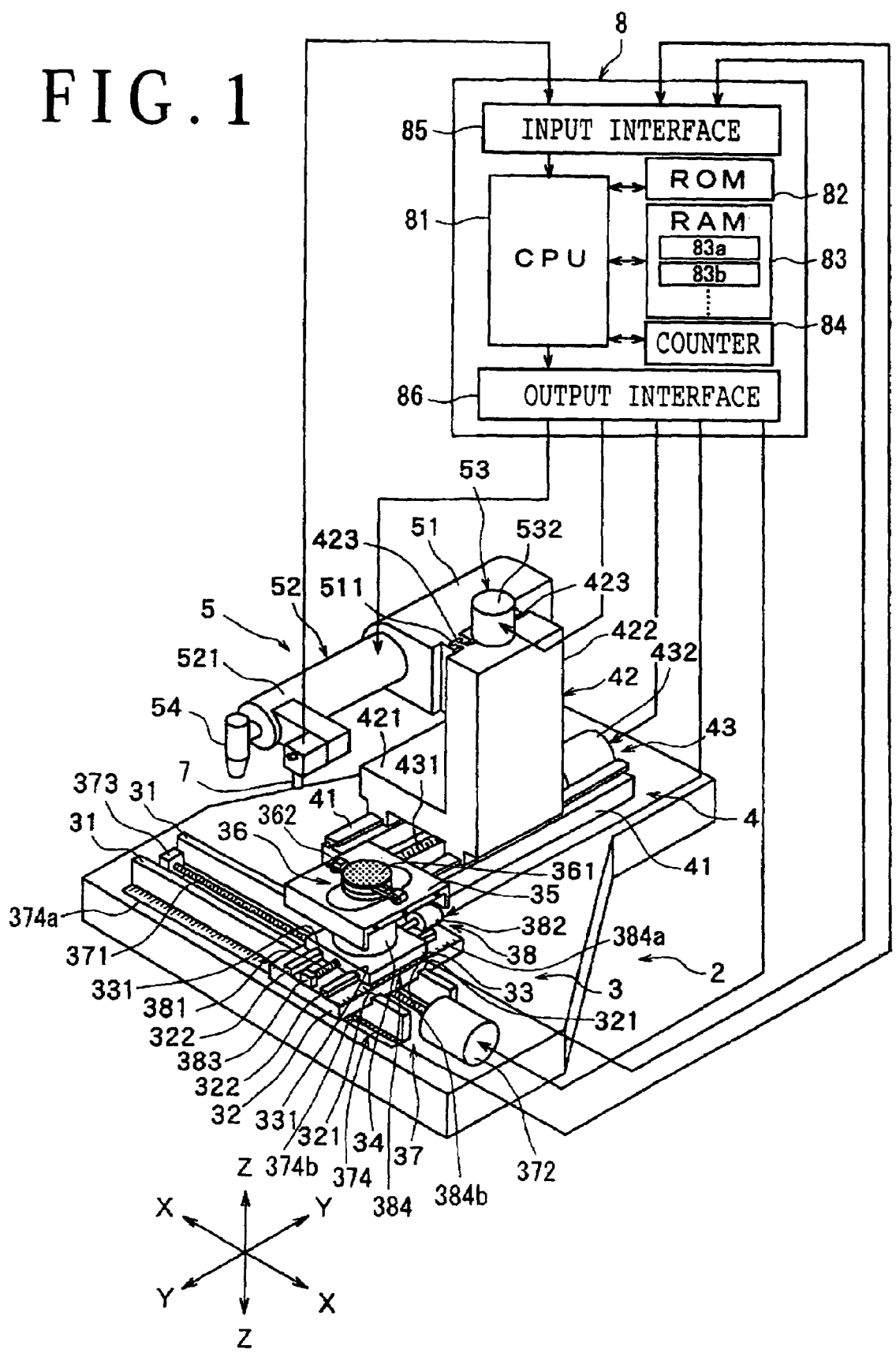
FIG. 1 is a perspective view of a laser beam machining apparatus configured according to the present invention.

Now, preferred embodiments of the laser beam machining apparatus configured according to the present invention will be described more in detail below, referring to the attached drawings. FIG. 1 shows a perspective view of a laser beam machining apparatus configured according to the present invention. The laser beam machining apparatus shown in FIG. 1 includes: a stationary base 2; a chuck table mechanism 3 which is disposed on the stationary base 2 so as to be movable in a machining feed direction indicated by arrow X and which holds a work; a laser beam irradiation unit support mechanism 4 disposed on the stationary base 2 so as to be movable in an indexing feed direction indicated by arrow Y which is perpendicular to the direction indicated by arrow X; and a laser beam irradiation unit 5 disposed on the laser beam unit support mechanism 4 so as to be movable in the direction indicated by arrow Z.

The chuck table mechanism 3 includes: a pair of guide rails 31, 31 disposed on the stationary base 2 in parallel to each other and along the machining feed direction indicated by arrow X; a first sliding block 32 disposed on the guide rails 31, 31 so as to be movable in the machining feed direction indicated by arrow X; a second sliding block 33 disposed on the first sliding block 32 so as to be movable in the indexing direction indicated by arrow Y; a cover table 35 supported on the second sliding block 33 by a hollow cylindrical member 34; and a chuck table 36 as work holding means. The chuck table 36 has a suction chuck 361 formed from a porous material, and is so configured that a work such as a circular disk-shaped semiconductor wafer is held on the suction chuck 361 by suction means (not shown). The chuck table 36 thus configured is rotated by a pulse motor (not shown) disposed inside the hollow cylindrical member 34. Incidentally, the chuck table 36 is equipped with clamps 362 for fixing an annular frame which will be described later.

The first sliding block 32 is provided in its lower surface with a pair of guided grooves 321, 321 for engagement with the pair of guide rails 31, 31, and is provided on its upper surface with a pair of guide rails 322, 322 formed in parallel to each other along the indexing feed direction indicated by arrow Y. The first sliding block 32 thus configured is movable in the machining feed direction indicated by arrow X along the pair of guide rails 31, 31, with its guided grooves 321, 321 in engagement with the pair of guide rails 31, 31. The chuck table mechanism 3 in the embodiment shown in the figure has machining feeding means 37 for moving the first sliding block 32 in the machining feed direction indicated by arrow X along the pair of guide rails 31, 31. The machining feeding means 37 includes a male screw rod 371 disposed between and in parallel with the pair of guide rails 31 and 31, and a drive source such as a pulse motor 372 for rotationally driving the male screw rod 371. The male screw rod 371 is rotatably supported at its one end on a bearing block 373 fixed to the stationary base 2, and is power-transmittingly connected at its other end to an output shaft of the pulse motor 372. Incidentally, the male screw rod 371 is in screw engagement with a penetrating female screw hole formed in a female screw block (not shown) projectingly provided at a lower surface of a central part of the first sliding block 32. Therefore, with the male screw rod 371 driven by the pulse motor 372 to rotate normally and reversely, the first sliding block 32 is moved in the machining feed direction indicated by arrow X along the guide rails 31, 31.

The laser beam machining apparatus in the embodiment shown in the figure has machining feed amount detecting means 374 for detecting the machining feed amount of the chuck table 36. The machining feed amount detecting means 374 is composed of a linear scale 374a disposed along the guide rail 31, and a reading head 374b which is disposed on the first sliding block 32 and which is moved along the linear scale 374a together with the first sliding block 32. The reading head 374b of the feed amount detecting means 374, in the embodiment shown in the figure, sends to control means (described later) a pulse signal having one pulse per 1-μm feed. Then, the control means (described later) counts the pulses contained in the pulse signal inputted thereto, thereby detecting the machining feed amount of the chuck table 36. Incidentally, in the case where the pulse motor 372 is used as the drive source of the machining feeding means 37, the machining feed amount of the chuck table 36 can be detected also by counting the driving pulses in the control means (described later) which outputs a driving signal to the pulse motor 372. In the case where a servo motor is used as the drive source of the machining feeding means 37, the machining feed amount of the chuck table 36 can also be detected by a method in which a pulse signal outputted from a rotary encoder for detecting the rotating speed of the servo motor is sent to the control means (described later), and the control means counts the pulses contained in the pulse signal inputted thereto.

The second sliding block 33 is provided in its lower surface with a pair of guided grooves 331, 331 for engagement with a pair of guide rails 322, 322 provided on an upper surface of the first sliding block 32, and is movable in the indexing feed direction indicated by arrow Y, with its guided grooves 331, 331 in engagement with the pair of guide rails 322, 322. The chuck table mechanism 3 in the embodiment shown in the figure has first indexing feeding means 38 for moving the second sliding block 33 in the indexing feed direction indicated by arrow Y along the pair of guide rails 322, 322 provided on the first sliding block 32. The first indexing feeding means 38 includes a male screw rod 381 disposed between and in parallel to the pair of guide rails 322 and 322, and a drive source such as a pulse motor 382 for rotationally driving the male screw rod 381. The male screw rod 381 is rotatably supported at its one end on a bearing block 383 fixed to the upper surface of the first sliding block 32, and is power-transmittingly connected at its other end to an output shaft of the pulse motor 382. Incidentally, the male screw rod 381 is in screw engagement with a penetrating female screw hole formed in a female screw block (not shown) projectingly provided on a lower surface of a central part of the second sliding block 33. Therefore, with the male screw rod 381 driven by the pulse motor 382 to rotate normally and reversely, the second sliding block 33 is moved in the indexing feed direction indicated by arrow Y along the guide rails 322, 322.

The laser beam machining apparatus in the embodiment shown in the figure has indexing feed amount detecting means 384 for detecting the indexing feed amount of the second sliding block 33. The indexing feed amount detecting means 384 is composed of a linear scale 384a disposed along the guide rail 322, and a reading head 384b which is disposed on the second sliding block 33 and which is moved along the linear scale 384a together with the second sliding block 33. The reading head 384b of the feed amount detecting means 384, in the embodiment shown in the figure, sends to the control means (described later) a pulse signal having one pulse per 1-μm feed. Then, the control means (described later) detects the indexing feed amount of the chuck table 36 by counting the pulses contained in the pulse signal inputted thereto. Incidentally, in the case where the pulse motor 382 is used as the drive source of the first indexing feeding means 38, the indexing feed amount of the chuck table 36 can be detected also by counting the driving pulses in the control means (described later) which outputs a driving signal to the pulse motor 382. In the case where a servo motor is used as the drive source of the first indexing feeding means 38, the indexing feed amount of the chuck table 36 can also be detected by a method in which a pulse signal outputted from a rotary encoder for detecting the rotating speed of the servo motor is sent to the control means (described later), and the control means counts the pulses contained in the pulse signal inputted thereto.

The laser beam irradiation unit support mechanism 4 includes a pair of guide rails 41, 41 disposed on the stationary base 2 in parallel to each other along the indexing feed direction indicated by arrow Y, and a movable support base 42 disposed on the guide rails 41, 41 so as to be movable in the direction indicated by arrow Y. The moving support base 42 is composed of a movable support part 421 movably arranged on the guide rails 41, 41, and an attaching part 422 attached to the moving support part 421. The attaching part 422 is provided on a side surface thereof with a pair of parallel guide rails 423, 423 extending in a direction indicated by arrow Z. The laser beam irradiation unit support mechanism 4 in the embodiment shown in the figure has second indexing feeding means 43 for moving the movable support base 42 in the indexing feed direction indicated by arrow Y along the pair of guide rails 41, 41. The second indexing feeding means 43 includes a male screw rod 431 disposed between and in parallel to the pair of guide rails 41, 41, and a drive source such as a pulse motor 432 for rotationally driving the male screw rod 431. The male screw rod 431 is rotatably supported at its one end on a bearing block (not shown) fixed to the stationary base 2, and is power-transmittingly connected at its other end to an output shaft of the pulse motor 432. Incidentally, the male screw rod 431 is in screw engagement with a female screw hole formed in a female screw block (not shown) projectingly projected on a lower surface of a central part of the moving support base 421 constituting the movable support base 42. Therefore, with the male screw rod 431 driven by the pulse motor 432 to rotate normally and reversely, the movable support base 42 is moved in the indexing feed direction indicated by arrow Y along the guide rails 41, 41.

The laser beam irradiation unit 5 in the embodiment shown in the figure has a unit holder 51, and laser beam irradiation means 52 mounted to the unit holder 51. The unit holder 51 is provided with a pair of guided grooves 511, 511 for slidable engagement with a pair of guide rails 423, 423 provided on the attaching part 422, and is supported so as to be movable in the direction indicated by arrow Z, with its guided grooves 511, 511 in engagement with the guide rails 423, 423.

The laser beam irradiation unit 5 in the embodiment shown in the figure has moving means 53 for moving the unit holder 51 in the direction of arrow Z (Z-axis direction) along the pair of guide rails 423, 423. The moving means 53 includes a male screw rod (not shown) disposed between the pair of guide rails 423, 423, and a drive source such as a pulse motor 532 for rotationally driving the male screw rod. With the male screw rod (not shown) driven by the pulse motor 532 to rotate normally and reversely, the moving means 53 moves the unit holder 51 and the laser beam irradiation means 52 in the direction of arrow Z (Z-axis direction) along the guide rails 423, 423. Incidentally, in the embodiment shown in the figure, the laser beam irradiation means 52 is moved upwards when the pulse motor 532 is driven to rotate normally, and the laser beam irradiation means 52 is moved downwards when the pulse motor 532 is driven to rotate reversely.

Figure 2:
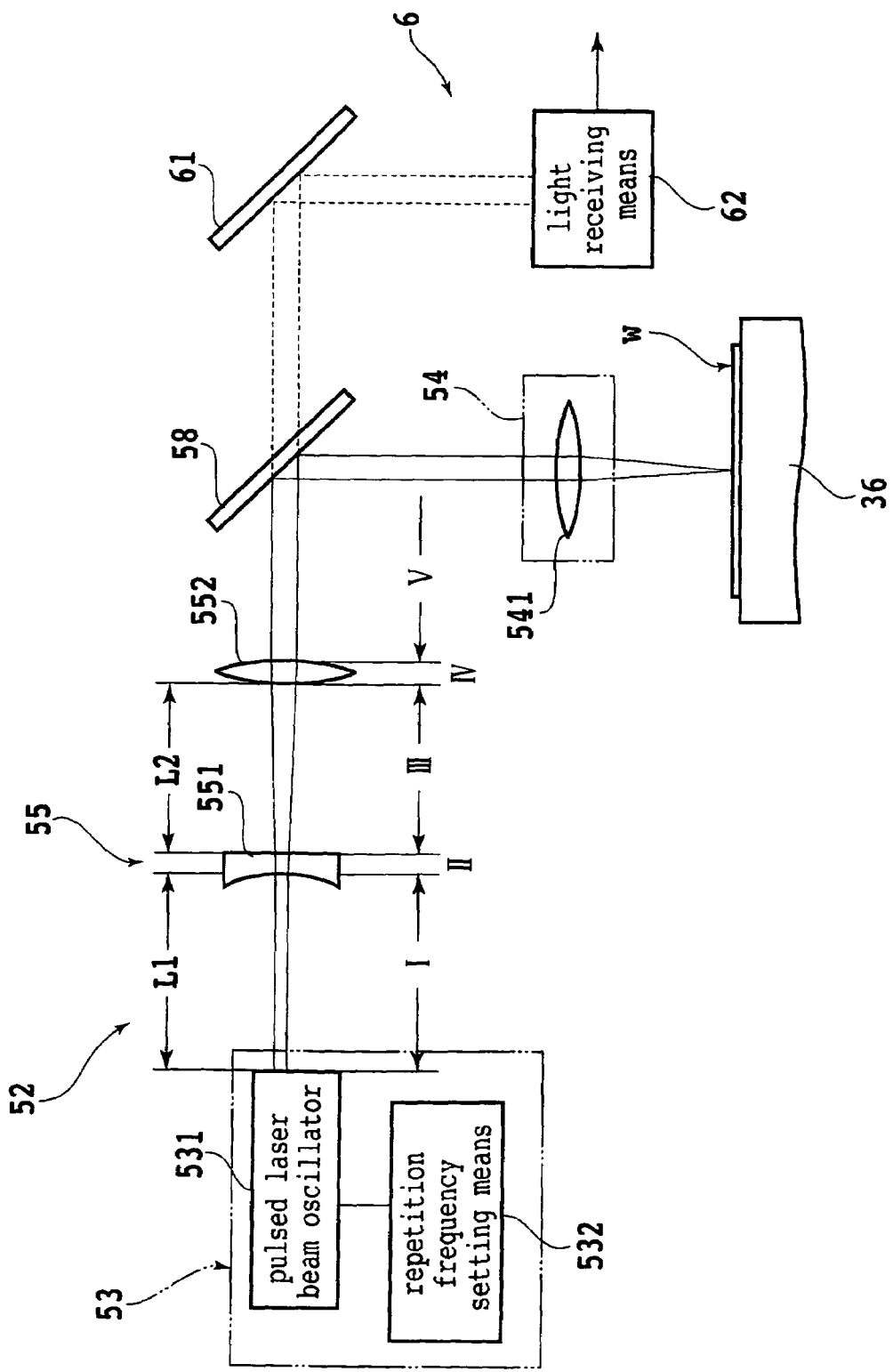
FIG. 2 is a block diagram schematically showing the configuration of a laser beam irradiation means and a beam adjusting means with which the laser beam machining apparatus shown in FIG. 1 is equipped.

The laser beam irradiation means 52 shown in the figure includes a hollow cylindrical casing 521 disposed substantially horizontally. In addition, the laser beam irradiation means 52 includes: pulsed laser beam oscillating means 53 disposed in the casing 521 as shown in FIG. 2; a condenser 54 which has an objective condenser lens 541 for condensing a laser beam oscillated by the laser beam oscillating means 53 and which is disposed at the tip of the casing 521; beam adjusting means 55 which is disposed between the laser beam oscillating means 53 and the condenser 54 and which adjusts the beam diameter and the divergence angle of the laser beam oscillated from the laser beam oscillating means 53; and a reflecting mirror 58 which is disposed between the beam adjusting means 55 and the condenser lens 541 and by which the laser beam having passed through the beam adjusting means 55 is reflected toward the condenser lens 541.

The pulsed laser beam oscillating means 53 includes a pulsed laser beam oscillator 531 composed of a YAG laser oscillator or an YVO4 laser oscillator, and repetition frequency setting means 532 annexed thereto. Incidentally, a pulsed laser beam oscillated from the pulsed laser beam oscillator 531 is, in a catalog or specification thereof, described to have, for example, a divergence angle of 1.8 rad±0.38 rad, and a beam diameter of 1.7 mm±0.4 mm: 50 cm. The pulsed laser beam oscillator 531 in this embodiment has a dispersion of ±0.38 rad in the divergence angle of the pulsed laser beam oscillated and a dispersion of ±0.4 mm in the beam diameter.

The condenser 54 is disposed opposite to the work held by the chuck table 36, and is so configured that the laser beam reflected by the reflecting mirror 58 is condensed by the condenser leans 541, before being radiated to the work W held by the chuck table 36. Incidentally, the reflecting mirror 58 in the embodiment shown in the figure is so configured that, of the laser beam having passed through the beam adjusting means 55, 99% is reflected toward the condenser lens 541, while 1% is transmitted therethrough.

Figure 3:
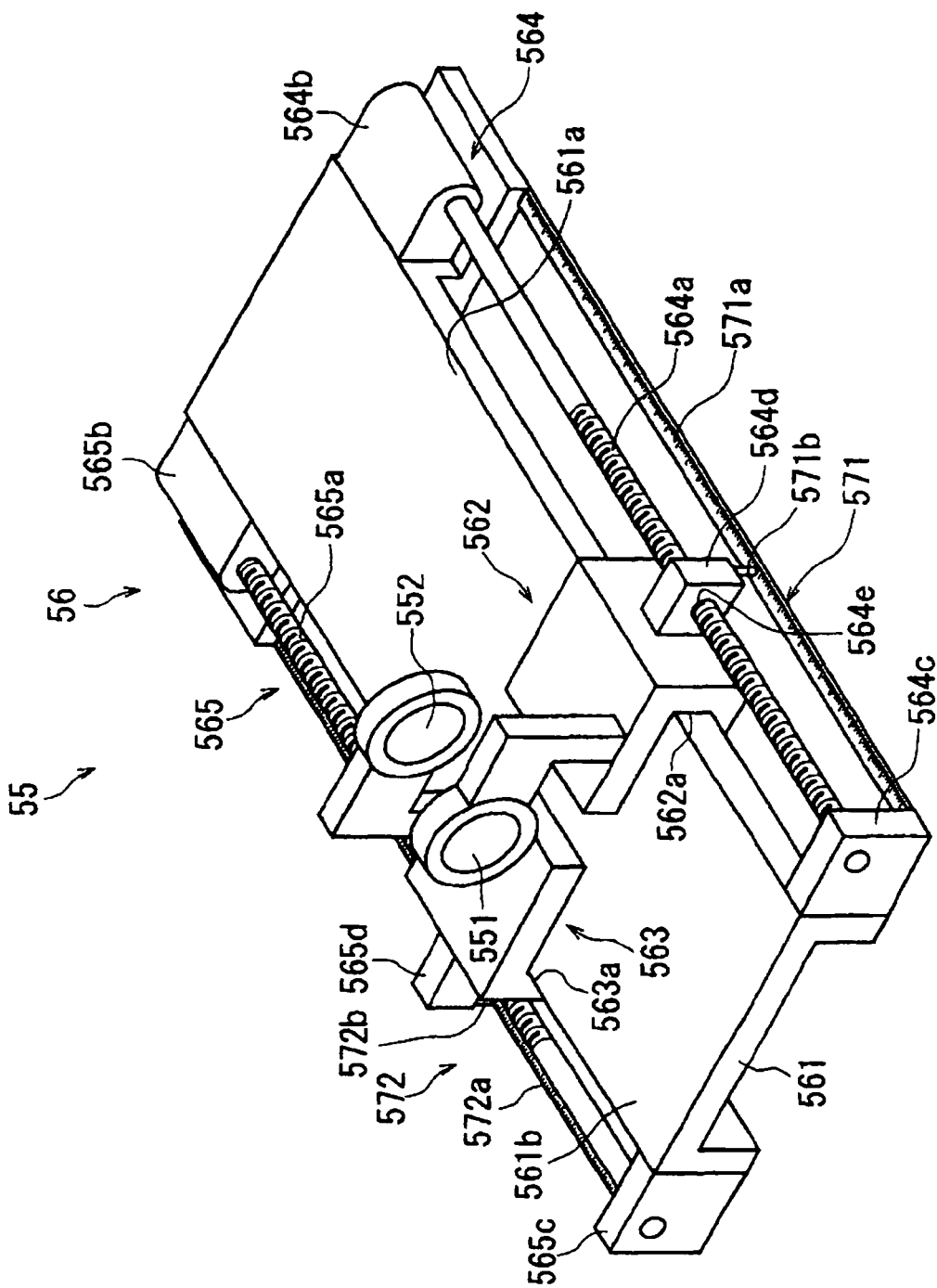
FIG. 3 is a perspective view of the beam adjusting means shown in FIG. 2.

The beam adjusting means 55 in the embodiment shown in the figure has a first lens 551 composed of a concave lens with a focal distance of f1, and a second lens 552 which is spaced from the first lens 551 and which is composed of a convex lens with a focal distance of f2. The first lens 551 and the second lens 552 are disposed in a lens moving mechanism 56, shown in FIG. 3, so as to be movable in an optical axis direction. The lens moving mechanism 56 shown in FIG. 3 includes a support base 561, a first lens support member 562 and a second lens support member 563 which are so disposed as to be movable respectively along both side edges of the support base 561, and first moving means 564 and second moving means 565 by which the first lens support member 562 and the second lens support member 563 are respectively moved along both side edges of the support base 561.

The first lens 551 and the second lens 552 making up the beam adjusting means 55 are so configured that the laser beam having a divergence angle which is oscillated from the laser beam oscillating means can be adjusted to be a parallel laser beam or collimated laser beam by regulating the distance L1 from the laser beam oscillating means 53 to the first lens 551, in FIG. 2, and the distance L2 from the first lens 551 to the second lens 552.

Returning to FIG. 3 to continue description, the support base 561 has both side edges forming a first guide rail 561a and a second guide rail 561b which are parallel to each other.

The first lens support member 562 has a guided rail 562a for engagement with the first guide rail 561a of the support base 561, and is movable along the first guide rail 561a, with its guided rail 562a in engagement with the first guide rail 561a. To the first lens support member 562 thus configured, the first lens 551 is attached. The second lens support member 563 has a guided rail 563b for engagement with the second guide rail 561b of the support base 561, and is movable along the second guide rail 561b, with its guided rail 563b in engagement with the second guide rail 561b. To the second lens support member 563 thus configured, the second lens 552 is attached. Incidentally, the first lens 551 and the second lens 552 attached respectively to the first lens support member 562 and the second lens support member 563 are disposed, with a spacing therebetween, on the same optical axis which is parallel to the first guide rail 561a and the second guide rail 561b.

The first moving means 564 includes a male screw rod 564a disposed along the first guide rail 561a of the support base 561, and a drive source such as a pulse motor 564b for rotationally driving the male screw rod 564a. The male screw rod 564a is rotatably supported at its one end on a bearing block 564c fixed to the support base 561, and is power-transmittingly connected at its other end to an output shaft of the pulse motor 564b. Incidentally, the male screw rod 564a is in screw engagement with a penetrating female screw hole 564e formed in a female screw block 564d attached to the first lens support member 562. Therefore, with the male screw rod 564a driven by the pulse motor 564b to rotate normally and reversely, the first lens support member 562 is moved along the first guide rail 561a. In addition, the second moving means 565 includes a male screw rod 565a disposed along the second guide rail 561b of the support base 561, and drive means such as a pulse motor 565b for rotationally driving the male screw rod 565a. The male screw rod 565a is rotatably supported at its one end on a bearing block 565c fixed to the support base 561, and is power-transmittingly connected at its other end to an output shaft of the pulse motor 565b. Incidentally, the male screw rod 565a is in screw engagement with a penetrating female screw hole (not shown) formed in a female screw block 565d attached to the second lens support member 563. Therefore, with the male screw rod 565a driven by the pulse motor 565b to rotate normally and reversely, the second lens support member 563 is moved along the second guide rail 561b. The pulse motor 564b of the first moving means 564 and the pulse motor 565b of the second moving means 565, in the just-mentioned configuration, are controlled by the control means which will be described later.

The beam adjusting means 55, in the embodiment shown in the figure, has first lens position detecting means 571 and second lens position detecting means 572 for detecting the moved positions of the first lens 551 and the second lens 552. The first lens position detecting means 571 is composed of a linear scale 571a disposed in parallel to the male screw rod 564a of the first moving means 564, and a reading head 571b which is disposed on a female screw block 564d attached to the first lens support member 562 and which is moved along the linear scale 571a. The reading head 571b sends detection signal to the control means which will be described later. In addition, the second lens position detecting means 572 is composed of a linear scale 575a disposed in parallel to the male screw rod 565a of the second moving means 565, and a reading head 572b which is disposed on a female screw block 564d attached to the second lens support member 562 and which is moved along the linear scale 572a. The reading head 572b sends a detection signal to the control means which will be described later. Incidentally, as for the detection means for detecting the moved positions of the first lens 551 and the second lens 552, the moved positions can also be obtained by counting the pulses in driving pulses for driving the pulse motor 564b of the first moving means 564 and the pulse motor 565b of the second moving means 565.

Figure 4A:
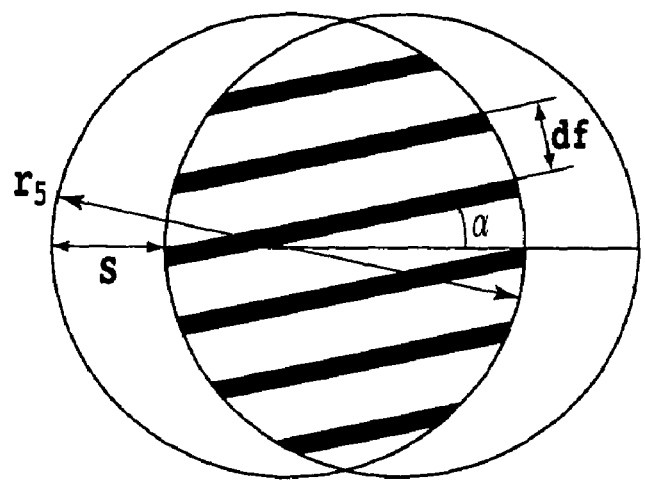
FIGS. 4A and 4B illustrate a detection signal detected by a beam diameter and divergence angle detecting means constituting the beam adjusting means shown in FIG. 2.
Figure 4B:
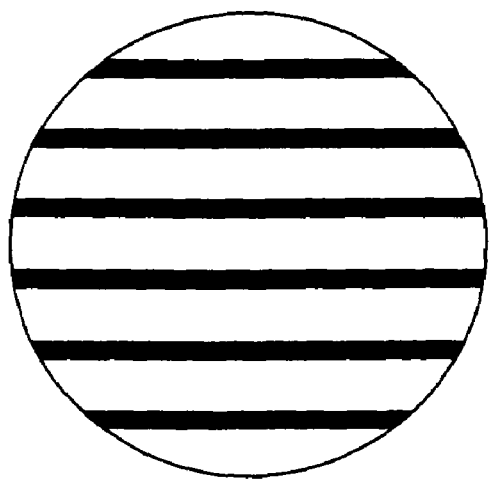

Returning to FIG. 2 to continue description, the laser beam machining apparatus in the embodiment shown in the figure has beam diameter and divergence angle detecting means 6 for detecting the beam diameter and the divergence angle of the laser beam which has passed through the first lens 551 and the second lens 552 of the beam adjusting means 55. The beam diameter and divergence angle detecting means 6 includes a shearing plate 61 by which the laser beam transmitted through the reflecting mirror 58 is reflected perpendicularly, and light receiving means 62 composed of a CCD or the like for imaging the laser beam reflected by the shearing plate 61. When the laser beam incident on the shearing plate 61 is not a collimated beam, it is reflected in a double-circle form as shown in FIG. 4A, and interference fringes according to the divergence angle are formed in the overlapping area of the two circles at an interference fringe angle α. On the other hand, when the laser beam incident on the shearing plate 61 is a collimated beam, it is reflected in such a manner that the two circles are superposed exactly on each other to form a single circle as shown in FIG. 4B, and the interference angle α of the interference fringes is zero (0). The light receiving means 62 receives the laser beam reflected by the shearing plate 61, and sends a light reception signal as shown in FIGS. 4A and 4B to the control means which will be described later.

Returning to FIG. 1 to continue description, image pickup means 7 for detecting the work region to be laser beam machined by the laser beam irradiation means 52 is disposed at a tip part of the casing 521 constituting the laser beam irradiation means 52. The image pickup means 7 is composed of an image pickup device (CCD) or the like, and sends a signal of an image picked up to the control means 8. The control means 8 is composed of a computer, which includes a central processing unit (CPU) 81 for performing arithmetic processes according to a control program, a random access memory (RAM) 83 for storing design value data on the work (described later), arithmetic operation results, etc., a counter 84, an input interface 85 and an output interface 86. The input interface 85 of the control means 8 is supplied as inputs with detection signals from the machining feed amount detecting means 374, the indexing feed amount detecting means 384, the reading head 571b of the first lens position detecting means 571, the reading head 572b of the second lens position detecting means 572, the light receiving means 62 of the beam diameter and divergence angle detecting means 6, the image pickup means 7 and the like. Control signals are outputted from the output interface 86 of the control means 8 to the pulse motor 372, the pulse motor 382, the pulse motor 432, the pulse motor 532, the laser beam irradiation means 52, the pulse motor 564b and the pulse motor 565b of the first moving means 564 and the second moving means 565 which constitute the lens moving mechanism 56, and the like.

The laser beam machining apparatus in the embodiment shown in the figures is configured as above-described, and its operation will be described as follows. In FIG. 2, the wavelength of the laser beam oscillated from the pulsed laser beam oscillator 531 is expressed as λ, the region ranging from the pulsed laser beam oscillator 531 to the first lens 551 as region I, the length of region I as L1, the beam diameter, at a position spaced by a predetermined distance from the pulsed laser beam oscillator 531, of the laser beam oscillated from the pulsed laser beam oscillator 531 as r1, and the divergence angle of the laser beam as θ1. The region of the first lens 551 is expressed as region II, the focal distance of the first lens 551 as f1, the beam diameter of the laser beam incident on the first lens 551 as r2, and the divergence angle in the first lens 551 as θ2. The region ranging from the first lens 551 to the second lens 552 is expressed as region III, the length of region III as L2, the beam diameter at a position spaced by a predetermined distance from the first lens 551 as r3, and the divergence at that position as θ3. The region of the second lens 552 is expressed as region IV, the focal distance of the second lens 552 as f2, the beam diameter of the laser beam incident on the second lens 552 as r4, and the divergence angle in the second lens 552 as θ4. The region ranging from the second lens 552 to the light receiving means 62 is expressed as region V, the beam diameter of the laser beam received by the light receiving means 62 as r5, and the divergence angle of the laser beam as θ5.

In regard of the optical system shown in FIG. 2, optical matrices are made and relationships between the parameters are determined as follows.

Region I: (1)

$$\begin{pmatrix} r_2 \\ \theta_2 \end{pmatrix} = M_1 \begin{pmatrix} r_1 \\ \theta_1 \end{pmatrix}$$

$$M_1 = \begin{pmatrix} 1 & L_1 \\ 0 & 1 \end{pmatrix}$$

Region II: (2)

$$\begin{pmatrix} r_3 \\ \theta_3 \end{pmatrix} = M_2 \begin{pmatrix} r_2 \\ \theta_2 \end{pmatrix}$$

$$M_2 = \begin{pmatrix} 1 & 0 \\ -\frac{1}{f_1} & 1 \end{pmatrix}$$

Region III: (3)

$$\begin{pmatrix} r_4 \\ \theta_4 \end{pmatrix} = M_3 \begin{pmatrix} r_3 \\ \theta_3 \end{pmatrix}$$

$$M_3 = \begin{pmatrix} 1 & L_2 \\ 0 & 1 \end{pmatrix}$$

Region IV: (4)

$$\begin{pmatrix} r_5 \\ \theta_5 \end{pmatrix} = M_4 \begin{pmatrix} r_4 \\ \theta_4 \end{pmatrix}$$

$$M_4 = \begin{pmatrix} 1 & 0 \\ -\frac{1}{f_2} & 1 \end{pmatrix}$$

Under these conditions, let the wavelength of the laser beam oscillated from the pulsed laser beam oscillator 531 be λ, the shift amount between the two circles in FIG. 4A be S, the interval of the interference fringes in FIG. 4A be df, and the interference fringe angle be α, then the divergence angle θ5 can be obtained by the following mathematical expression 1:

$$\theta_5 = \frac{r_5 \cdot \lambda \cdot \tan\alpha}{S \cdot d_f}$$ [Math 1]

In addition, under the above-mentioned conditions, the following mathematical expression 2 is established.

$$\begin{pmatrix} r_5 \\ \theta_5 \end{pmatrix} = M_4 M_3 M_2 M_1 \begin{pmatrix} r_1 \\ \theta_1 \end{pmatrix}$$ [Math 2]

Now, a control by which the laser beam, having a divergence angle, oscillated from the pulsed laser beam oscillator 531 is made to be a collimated beam having a predetermined beam diameter will be described below. After the pulsed laser beam oscillator 531 is mounted to the above-mentioned laser beam machining apparatus, the control means 8 controls the pulse motor 564b of the first moving means 564 and the pulse motor 565b of the second moving means 565 to move the first lens support member 562 and the second lens support member 563, thereby positioning the components so that the distance L1 from the laser beam oscillating means 53 to the first lens 551 and the distance L2 from the first lens 551 to the second lens 552 will be preset initial values (the values described in the catalog or specification) (for example, L1: 40 mm, L2: 90 mm). Next, the control means 8 actuates the laser beam oscillating means 53 to oscillate a laser beam, and a light reception signal shown in FIG. 4A which is received by the light receiving means 62 of the beam diameter and divergence angle detecting means 6 as above-mentioned is inputted. Then, based on the light reception signal from the light receiving means 62, the control means 8 determines the beam diameter r5, the shift amount S in the double-circle pattern, the interval df of the interference fringes, and the interference fringe angle α, and computes the divergence angle θ5 by use of the mathematical expression 1.

When the divergence angle θ5 is thus obtained, the control means 8 puts the divergence angle θ5 and the beam diameter r5, which is obtained based on the light reception signal from the light receiving means 62 as above-mentioned, into the mathematical expression 2, to obtain the beam diameter r1 and the divergence angle θ1 of the laser beam oscillated from the pulsed laser beam oscillator 531. In this case, as the values of the distance L1 from the laser beam oscillating means 53 to the first lens 551 and the distance L2 from the first lens 551 to the second lens 552, the preset initial values (for example, L1: 40 mm, L2: 90 mm) are used.

When the beam diameter r1 and the divergence angle θ1 of the laser beam oscillated from the pulsed laser beam oscillator 531 are determined by use of the mathematical expression 2 as above-mentioned, the beam diameter r5 and the divergence angle θ5 of the laser beam received by the light receiving means 62 are set to desired values (for example, r5: 4.0 mm, θ5: 0 degrees). Then, the control means 8 computes the distance L1 from the laser beam oscillating means 53 to the first lens 551 and the distance L2 from the first lens 551 to the second lens 552, by putting into the mathematical expression 1 the beam diameter r1 and the divergence angle θ1 of the laser beam as well as the beam diameter r5 and the divergence angle θ5 set to the desired values.

When the distance L1 from the laser beam oscillating means 53 to the first lens 551 and the distance L2 from the first lens 551 to the second lens 552 are determined in this manner, the control means 8 controls the pulse motor 564b and the pulse motor 565b of the first moving means 564 and the second moving means 565 constituting the lens moving mechanism 56 of the beam adjusting means 55 so that the distance from the laser beam oscillating means 53 to the first lens 551 attached to the first lens support member 562 will be L1 and that the distance from the first lens 551 to the second lens 552 attached to the second lens support member 563 will be L2. In this case, the control means 8 controls the pulse motor 564b of the first moving means 564 and the pulse motor 565b of the second moving means 565, based on the position signals relevant to the first lens 551 and the second lens 552 which are sent from the first lens position detecting means 571 and the second lens position detecting means 572. Thus, in the laser beam machining apparatus based on the present invention, upon mounting or replacement of the laser beam oscillator, the beam diameter and the divergence angle (parallelism) of the laser beam oscillated from the laser beam oscillator and incident on the condenser lens can be adjusted automatically.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam machining apparatus comprising:
a chuck table for holding a work;
laser beam irradiation means for irradiating said work held by said chuck table with a pulsed laser beam, said laser beam irradiation means having a laser beam oscillator and a condenser lens for condensing the laser beam oscillated by said laser beam oscillator;
beam adjusting means disposed between said laser beam oscillator and said condenser lens and by which the beam diameter and the divergence angle of the laser beam oscillated from said laser beam oscillator are adjusted;
wherein said beam adjusting means includes: a first lens and a second lens which are disposed on an optical path of the laser beam oscillated from said laser beam oscillator and are movable along said optical path; first moving means and second moving means for respectively moving said first lens and said second lens along said optical path; and first lens position detecting means and second lens position detecting means for respectively detecting the moved positions of said first lens and said second lens,
beam diameter and divergence angle detecting means for detecting the beam diameter and the divergence angle of the laser beam having passed through said beam adjusting means;
wherein said beam diameter and divergence angle detecting means includes: a shearing plate for reflecting the laser beam transmitted through said first lens and said second lens; and light receiving means which receives the laser beam reflected by said shearing plate and which sends a light reception signal to said control means,
control means which computes the beam diameter and the divergence angle of the laser beam oscillated from said laser beam oscillator, based on said light reception signal from said beam diameter and divergence angle detecting means, and which controls said beam adjusting means, based on the computed beam diameter and divergence angle of the laser beam oscillated from said laser beam oscillator and desired values for the beam diameter and the divergence angle of the laser beam incident on said beam diameter and divergence angle detecting means,
wherein said control means obtains the beam diameter r5 of the laser beam received by said light receiving means, based on said light reception signal from said light receiving means, and obtains the divergence angle θ5 of the laser beam by use of the following mathematical expression 1:

$$\theta_5 = \frac{r_5 \cdot \lambda \cdot \tan\alpha}{S \cdot d_f}$$

where λ is the wavelength of the laser beam oscillated from said pulsed laser beam oscillator, S is the shift amount in a double-circle pattern of said light reception signal relevant to the laser beam received by said light receiving means, df is the interval of interference fringes, and α is the interference fringe angle;

next, based on the beam diameter r5 of the laser beam received by said light receiving means and the divergence angle θ5 obtained by use of the mathematical expression 1, said control means obtains the beam diameter r1 and the divergence angle θ1 of the laser beam oscillated from said pulsed laser beam oscillator by putting the beam diameter r5 obtained based on the laser beam received by said light receiving means and the divergence angle θ5 obtained by use of the mathematical expression 1 into the following mathematical expression 2:

$$\begin{pmatrix} r_5 \\ \theta_5 \end{pmatrix} = M_4 M_3 M_2 M_1 \begin{pmatrix} r_1 \\ \theta_1 \end{pmatrix}$$

where

Laser Region I:

$$\begin{pmatrix} r_2 \\ \theta_2 \end{pmatrix} = M_1 \begin{pmatrix} r_1 \\ \theta_1 \end{pmatrix}$$

$$M_1 = \begin{pmatrix} 1 & L_1 \\ 0 & 1 \end{pmatrix}$$

Laser Region II:

$$\begin{pmatrix} r_3 \\ \theta_3 \end{pmatrix} = M_2 \begin{pmatrix} r_2 \\ \theta_2 \end{pmatrix}$$

$$M_2 = \begin{pmatrix} 1 & 0 \\ -\frac{1}{f_1} & 1 \end{pmatrix}$$

Laser Region III:

$$\begin{pmatrix} r_4 \\ \theta_4 \end{pmatrix} = M_3 \begin{pmatrix} r_3 \\ \theta_3 \end{pmatrix}$$

$$M_3 = \begin{pmatrix} 1 & L_2 \\ 0 & 1 \end{pmatrix}$$

Laser Region IV:

$$\begin{pmatrix} r_5 \\ \theta_5 \end{pmatrix} = M_4 \begin{pmatrix} r_4 \\ \theta_4 \end{pmatrix}$$

$$M_4 = \begin{pmatrix} 1 & 0 \\ -\frac{1}{f_2} & 1 \end{pmatrix}$$

where laser region I is the region ranging from said pulsed laser beam oscillator to said first lens, L1 is the length of laser region I; r1 and θ1 are the beam diameter and the divergence angle, at a position spaced by a predetermined distance from said pulsed laser beam oscillator, of the laser beam oscillated from said pulsed laser beam oscillator; laser region II is the region of said first lens; f1 is the focal distance of said first lens; r2 is the beam diameter of the laser beam incident on said first lens; θ2 is the divergence angle in said first lens; laser region III is the region ranging from said first lens to said second lens; L2 is the length of laser region III; r3 and θ3 are the beam diameter and the divergence angle at a position spaced by a predetermined distance from said first lens; laser region IV is the region of said second lens; f2 is the focal distance of said second lens; r4 is the beam diameter of the laser beam incident on said second lens; θ4 is the divergence angle in said second lens; laser region V is the region ranging from said second lens to said light receiving means; and r5 and θ5 are the beam diameter and the divergence angle of the laser beam received by said light receiving means; and subsequently, said control means puts the beam diameter r1 and the divergence angle θ1 obtained by use of the mathematical expression 2 as well as desired values for the beam diameter r5 and the divergence angle θ5 again into the mathematical expression 2, to thereby obtain the length L1 from said pulsed laser beam oscillator to said first lens and the length L2 from said first lens to said second lens.

* * * * *